(12) United States Patent
Taft et al.

(10) Patent No.: US 8,121,741 B2
(45) Date of Patent: Feb. 21, 2012

(54) INTELLIGENT MONITORING OF AN ELECTRICAL UTILITY GRID

(75) Inventors: Jeffrey D. Taft, Canonsburg, PA (US); Yan Zhu, Thousand Oaks, CA (US)

(73) Assignee: International Business Machines Corporation, Armonk, NY (US)

(*) Notice: Subject to any disclaimer, the term of this patent is extended or adjusted under 35 U.S.C. 154(b) by 904 days.

(21) Appl. No.: 12/118,481

(22) Filed: May 9, 2008

(65) Prior Publication Data
US 2009/0281679 A1    Nov. 12, 2009

(51) Int. Cl.
*G05D 3/12* (2006.01)
*G05D 5/00* (2006.01)
*G05D 9/00* (2006.01)
*G05D 17/00* (2006.01)
*G05B 23/02* (2006.01)
*G08C 19/20* (2006.01)
*G08C 19/04* (2006.01)
*G08C 19/10* (2006.01)
*G06F 11/00* (2006.01)

(52) U.S. Cl. ........ 700/295; 700/286; 700/291; 700/292; 700/293; 700/294; 340/3.1; 340/870.03; 340/870.11; 702/188

(58) Field of Classification Search .................. 324/74; 700/286, 291, 292, 293, 294, 295, 297; 702/57, 702/58, 60, 61, 62, 85, 104, 188; 340/3.1, 340/310.11, 637, 870.02, 870.03, 870.11; 361/55, 56, 59

See application file for complete search history.

(56) References Cited

U.S. PATENT DOCUMENTS

| | | | | |
|---|---|---|---|---|
| 4,119,948 A * | 10/1978 | Ward et al. | ............... | 340/870.02 |
| 4,567,563 A * | 1/1986 | Hirsch | ............... | 700/284 |
| 5,568,399 A * | 10/1996 | Sumic | ............... | 700/293 |
| 5,627,759 A * | 5/1997 | Bearden et al. | ............... | 702/62 |
| 5,963,457 A * | 10/1999 | Kanoi et al. | ............... | 700/291 |
| 6,073,169 A * | 6/2000 | Shuey et al. | ............... | 709/217 |
| 6,088,659 A * | 7/2000 | Kelley et al. | ............... | 702/62 |
| 6,333,975 B1 * | 12/2001 | Brunn et al. | ............... | 379/106.03 |
| 6,360,178 B1 * | 3/2002 | Parsons et al. | ............... | 702/65 |
| 6,411,529 B1 * | 6/2002 | Svensson | ............... | 363/35 |

(Continued)

FOREIGN PATENT DOCUMENTS

WO 2006102172 A2  9/2006

OTHER PUBLICATIONS

"Notification of Transmittal of the International Search Report and the Written Opinion of the International Searching Authority, or the Declaration" For PCT EP2009/055610, Jun. 7, 2010.

*Primary Examiner* — Ronald Hartman, Jr.
(74) *Attorney, Agent, or Firm* — Yudell Isidore Ng Russell PLLC

(57) ABSTRACT

A method of managing an electric utility grid includes geographically grouping a set of customer electric usage meters to create a set of fine sensors on a power grid. Each usage meter in the grouped set is capable of being remotely monitored, and each usage meter is at a different location along the power line. If a power anomaly is detected at the subset of meters, then power to the electric utility grid is adjusted to correct the anomaly.

19 Claims, 13 Drawing Sheets

U.S. PATENT DOCUMENTS

| | | | |
|---|---|---|---|
| 6,459,998 B1* | 10/2002 | Hoffman | 702/62 |
| 6,486,569 B2* | 11/2002 | Couture | 307/98 |
| 6,496,342 B1* | 12/2002 | Horvath et al. | 361/65 |
| 6,618,648 B1* | 9/2003 | Shirota et al. | 700/291 |
| 6,747,575 B2* | 6/2004 | Chauvin et al. | 340/932.2 |
| 6,751,562 B1* | 6/2004 | Blackett et al. | 702/61 |
| 6,772,075 B2* | 8/2004 | Parsons et al. | 702/65 |
| 6,810,339 B2* | 10/2004 | Wills | 702/65 |
| 6,907,321 B2* | 6/2005 | Kearney et al. | 700/292 |
| 6,946,972 B2* | 9/2005 | Mueller et al. | 340/870.02 |
| 6,963,793 B2* | 11/2005 | Yamada et al. | 700/293 |
| 6,998,962 B2* | 2/2006 | Cope et al. | 340/870.02 |
| 7,053,790 B2* | 5/2006 | Jang et al. | 340/870.02 |
| 7,069,117 B2* | 6/2006 | Wilson et al. | 700/295 |
| 7,085,824 B2* | 8/2006 | Forth et al. | 709/221 |
| 7,089,125 B2* | 8/2006 | Sonderegger | 702/57 |
| 7,184,903 B1* | 2/2007 | Williams et al. | 702/60 |
| 7,209,840 B2* | 4/2007 | Petite et al. | 702/62 |
| 7,231,281 B2* | 6/2007 | Costa | 700/286 |
| 7,236,908 B2* | 6/2007 | Timko et al. | 702/176 |
| 7,271,735 B2* | 9/2007 | Rogai | 340/870.02 |
| 7,272,516 B2* | 9/2007 | Wang et al. | 702/60 |
| 7,283,916 B2* | 10/2007 | Cahill-O'Brien et al. | 702/64 |
| 7,295,133 B1* | 11/2007 | McCollough, Jr. | 340/870.07 |
| 7,308,370 B2* | 12/2007 | Mason et al. | 702/65 |
| 7,447,568 B2* | 11/2008 | Christensen et al. | 700/298 |
| 7,519,506 B2* | 4/2009 | Trias | 702/182 |
| 7,560,834 B2* | 7/2009 | Joho | 307/127 |
| 7,680,548 B2* | 3/2010 | Khorramshahi | 700/22 |
| 7,732,943 B2* | 6/2010 | Karlsson et al. | 307/39 |
| 7,747,739 B2* | 6/2010 | Bridges et al. | 709/224 |
| 7,844,370 B2* | 11/2010 | Pollack et al. | 700/291 |
| 7,853,417 B2* | 12/2010 | Vaswani et al. | 702/60 |
| 7,860,615 B2* | 12/2010 | Nelson et al. | 700/286 |
| 2004/0024494 A1* | 2/2004 | Bayoumi et al. | 700/286 |
| 2004/0158360 A1* | 8/2004 | Garland et al. | 700/286 |
| 2004/0158417 A1* | 8/2004 | Bonet | 702/57 |
| 2004/0181492 A1* | 9/2004 | Rybakowski et al. | 705/63 |
| 2005/0090995 A1* | 4/2005 | Sonderegger | 702/57 |
| 2006/0085346 A1* | 4/2006 | Riley | 705/51 |
| 2006/0103546 A1* | 5/2006 | Salser et al. | 340/870.02 |
| 2006/0217936 A1* | 9/2006 | Mason et al. | 702/188 |
| 2006/0224335 A1* | 10/2006 | Borleske et al. | 702/62 |
| 2007/0063866 A1* | 3/2007 | Webb | 340/870.02 |
| 2007/0124109 A1* | 5/2007 | Timko et al. | 702/176 |
| 2007/0168161 A1* | 7/2007 | Vellore et al. | 702/182 |
| 2007/0211768 A1 | 9/2007 | Cornwall et al. | |
| 2007/0219755 A1* | 9/2007 | Williams et al. | 702/188 |
| 2007/0222636 A1* | 9/2007 | Iwamura | 340/870.01 |
| 2008/0039979 A1* | 2/2008 | Bridges et al. | 700/292 |
| 2008/0077336 A1* | 3/2008 | Fernandes | 702/57 |
| 2008/0219239 A1* | 9/2008 | Bell et al. | 370/351 |
| 2008/0231114 A1* | 9/2008 | Tolnar et al. | 307/38 |
| 2009/0030556 A1* | 1/2009 | Castelli et al. | 700/286 |
| 2009/0187284 A1* | 7/2009 | Kreiss et al. | 700/291 |
| 2009/0224938 A1* | 9/2009 | Kopp et al. | 340/870.02 |
| 2009/0265042 A1* | 10/2009 | Mollenkopf et al. | 700/298 |
| 2009/0281673 A1* | 11/2009 | Taft | 700/286 |
| 2011/0029148 A1* | 2/2011 | Yang et al. | 700/297 |

* cited by examiner

INTELLIGENT MONITORING OF AN ELECTRICAL UTILITY GRID

BACKGROUND OF THE INVENTION

1. Technical Field

The present disclosure relates in general to the field of electrical utility grids, and particularly to managing electrical utility grids. Still more particularly, the present disclosure relates to utilizing intelligent electricity usage meters in an Advanced Meter Infrastructure (AMI) to manage an electrical utility grid.

2. Description of the Related Art

Electrical utility grids transport electricity from a power generator (hydroelectric, nuclear, coal-powered, etc.) to a final customer location. Monitoring of the health and operation of the electrical utility grid is performed by central sensors, which detect voltage levels on main distribution trunks. However, such sensors do not provide the granularity necessary to understand and/or control operation of the electrical utility grid at the customer location level.

SUMMARY OF THE INVENTION

A method of managing an electric utility grid includes geographically grouping a set of customer intelligent electric usage meters along a power feeder line to create a fine sensor web on a power grid. Each intelligent electric usage meter in the grouped set of usage meters is remotely monitored for power quality. An Uncompensated Feeder Voltage Profile is created according to voltage readings from a subset of meters along a feeder selected for voltage profiling. If a power anomaly is detected at the subset of meters, then power to the electric utility grid is adjusted to correct the anomaly.

The above, as well as additional purposes, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further purposes and advantages thereof, will best be understood by reference to the following detailed description of an illustrative embodiment when read in conjunction with the accompanying drawings, where:

DETAILED DESCRIPTION OF THE PREFERRED EMBODIMENT

Figure 1A:
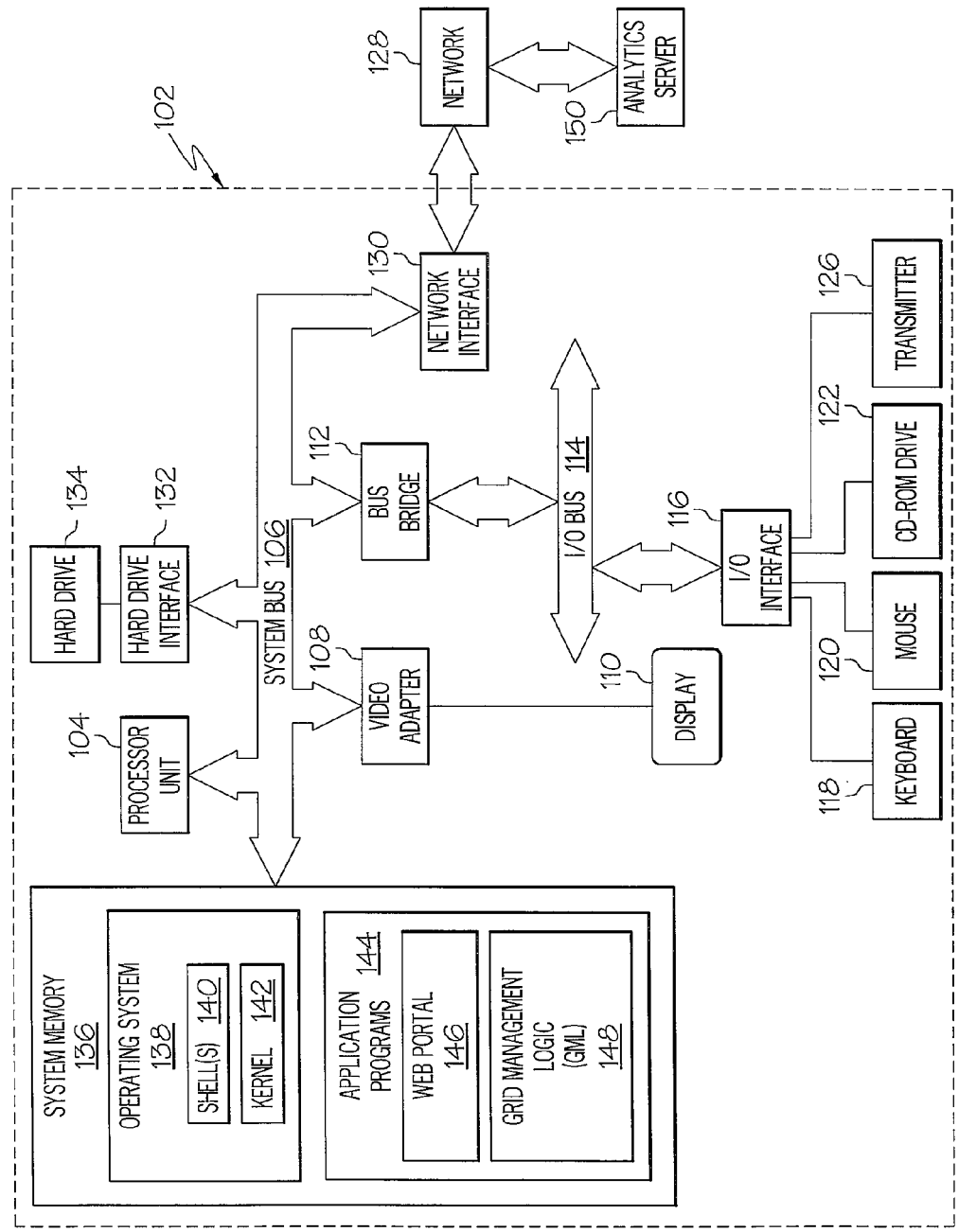
FIG. 1A illustrates an exemplary computer in which the present invention may be utilized.

With reference now to FIG. 1A, there is depicted a block diagram of an exemplary computer 102, in which the present invention may be utilized. Note that some or all of the exemplary architecture shown for computer 102 may be utilized by an analytics server 150, SCADA servers 160a-n (shown in FIG. 1B) a Data Collection Engine (DCE) server 202 (shown in FIG. 2), an analytics server 204 (shown in FIG. 2), an intelligent electricity usage meter 302 (shown in FIG. 3), a portal server 642, portal client 646 and/or servers shown in datacenter 640 in FIG. 6.

Computer 102 includes a processor unit 104 that is coupled to a system bus 106. A video adapter 108, which drives/supports a display 110, is also coupled to system bus 106. System bus 106 is coupled via a bus bridge 112 to an Input/Output (I/O) bus 114. An I/O interface 116 is coupled to I/O bus 114. I/O interface 116 affords communication with various I/O devices, including a keyboard 118, a mouse 120, a Compact Disk-Read Only Memory (CD-ROM) drive 122, a floppy disk drive 124, and a transmitter 126. Transmitter 126 may be a wire-based or wireless-based transmitter, capable of transmitting a signal over a wire or a wireless signal (e.g., a radio wave). The format of the ports connected to I/O interface 116 may be any known to those skilled in the art of computer architecture, including but not limited to Universal Serial Bus (USB) ports.

Computer 102 is able to communicate with an analytics server 150 via a network 128 using a network interface 130, which is coupled to system bus 106. Network 128 may be an external network such as the Internet, or an internal network such as an Ethernet or a Virtual Private Network (VPN).

A hard drive interface 132 is also coupled to system bus 106. Hard drive interface 132 interfaces with a hard drive 134. In a preferred embodiment, hard drive 134 populates a system memory 136, which is also coupled to system bus 106. System memory is defined as a lowest level of volatile memory in computer 102. This volatile memory includes additional higher levels of volatile memory (not shown), including, but not limited to, cache memory, registers and buffers. Data that populates system memory 136 includes computer 102's operating system (OS) 138 and application programs 144.

OS 138 includes a shell 140, for providing transparent user access to resources such as application programs 144. Generally, shell 140 is a program that provides an interpreter and an interface between the user and the operating system. More specifically, shell 140 executes commands that are entered into a command line user interface or from a file. Thus, shell 140 (also called a command processor) is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. Note that while shell 140 is a text-based, line-oriented user interface, the present invention will equally well support other user interface modes, such as graphical, voice, gestural, etc.

As depicted, OS 138 also includes kernel 142, which includes lower levels of functionality for OS 138, including providing essential services required by other parts of OS 138 and application programs 144, including memory management, process and task management, disk management, and mouse and keyboard management.

Application programs 144 include a web portal 146. The portal 146 includes program modules and instructions enabling a World Wide Web (WWW) client (i.e., computer 102) to send and receive network messages to the Internet using HyperText Transfer Protocol (HTTP) messaging, thus providing user friendly user interfaces to the power grid users.

Application programs 144 in computer 102's system memory (as well as software deploying analytics server 150's system memory) also include a Grid Management Logic (GML) 148. GML 148 includes code for implementing the processes described in FIGs. 2-10B. In one embodiment, computer 102 is able to download GML 148 from analytics server 150, including in an "on demand" basis, as described in greater detail below in FIGS. 9A-10B. Note further that, in a preferred embodiment of the present invention. Analytics server 150 performs all of the functions associated with the present invention (including execution of GML 148), thus freeing computer 102 from having to use its own internal computing resources to execute GML 148.

The hardware elements depicted in computer 102 are not intended to be exhaustive, but rather are representative to highlight essential components required by the present invention. For instance, computer 102 may include alternate memory storage devices such as magnetic cassettes, Digital Versatile Disks (DVDs), Bernoulli cartridges, and the like. These and other variations are intended to be within the spirit and scope of the present invention.

Figure 1B:
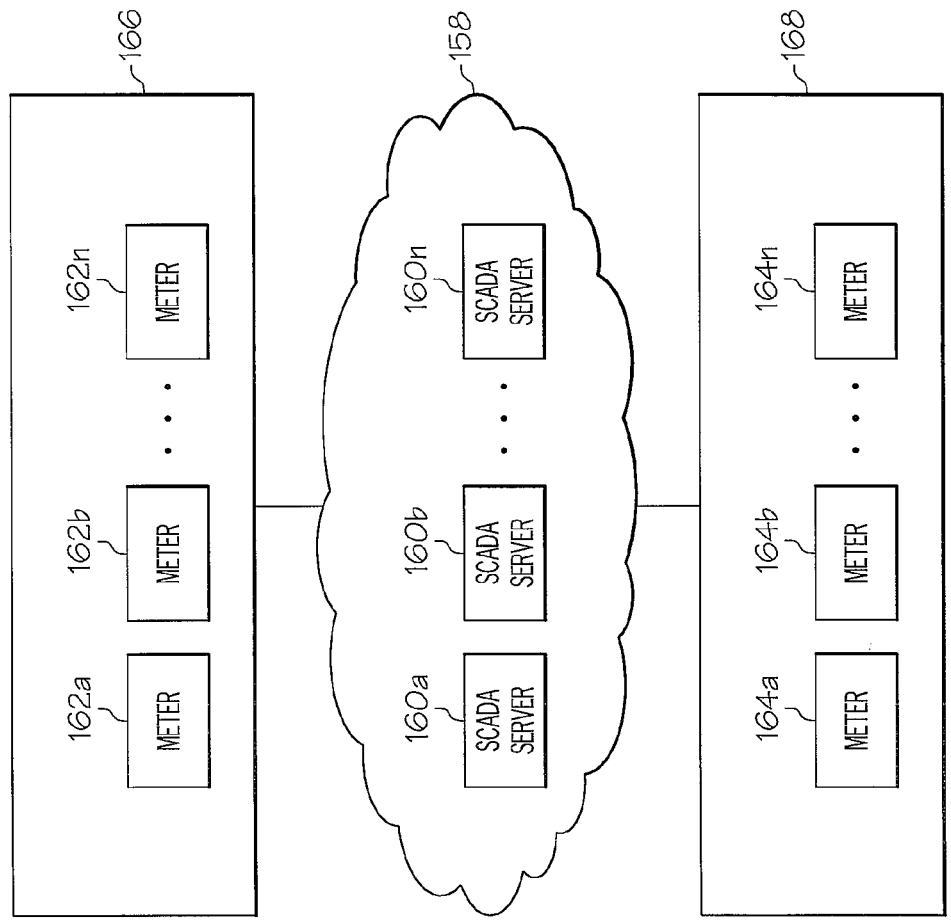
FIG. 1B depicts an exemplary SCADA based system for monitoring feeder-based sets of sensors.

With reference now to FIG. 1B, an exemplary Supervisory Control and Data Acquisition (SCADA) network 158, for use with the present invention, is presented. SCADA network 158 may include multiple SCADA servers 160a-n (where "n" is an integer). SCADA servers 160a-n monitor and process information from different feeders, including the exemplary feeders 166 and 168 depicted. Each feeder includes multiple meters (respectively 162a-n and 164a-n), which are meters that measure utilities at customer locations.

Figure 2:
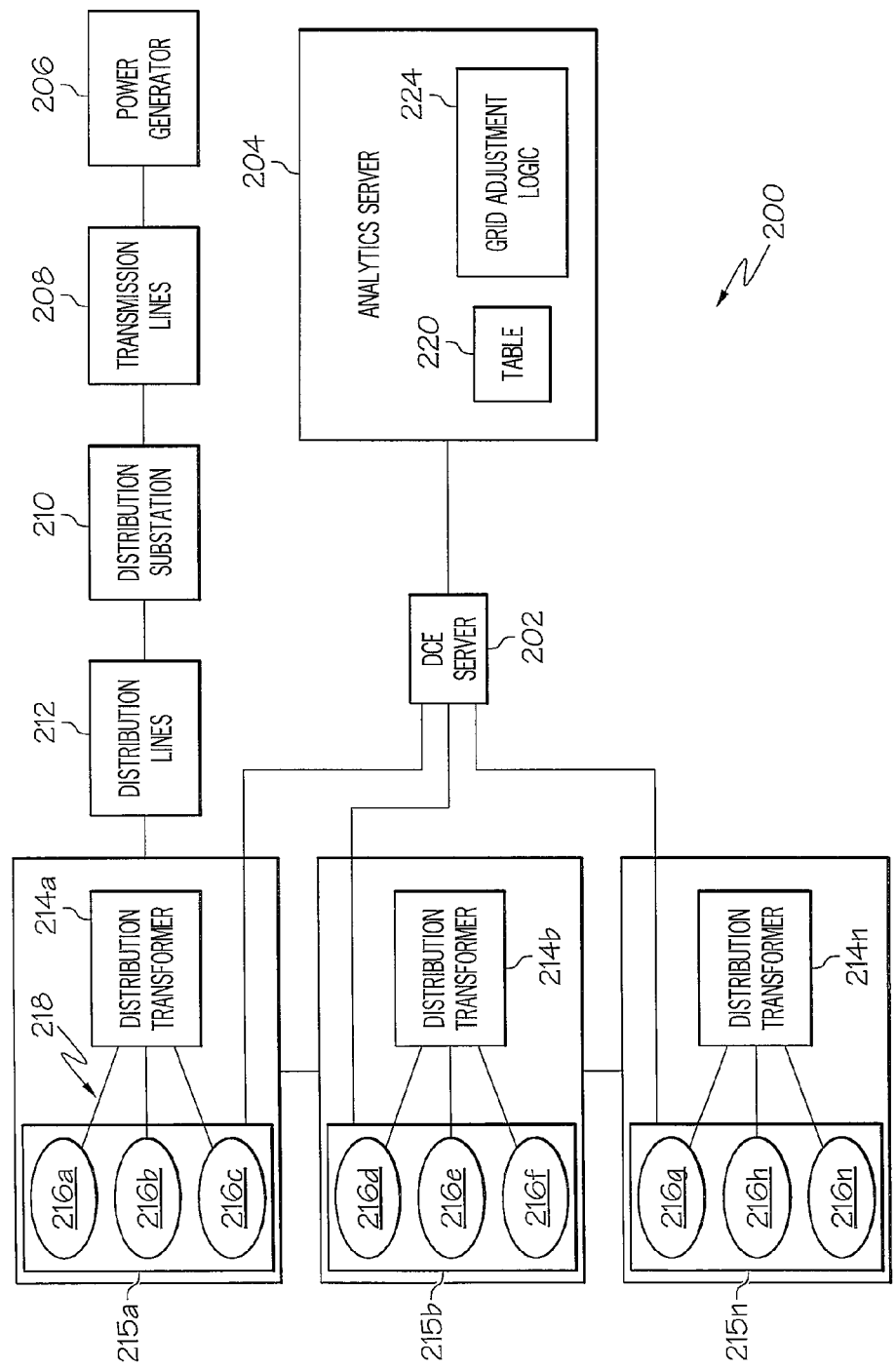
FIG. 2 depicts an electricity distribution grid that uses existing customer electricity usage meters for function monitoring and management.

With reference now to FIG. 2, an exemplary electric power grid 200, having novel features described by the present invention, is presented. Electric power is initially generated by a power generator 206, which may be powered by water (hydroelectric), fossil fuel (e.g., coal powered), nuclear material (i.e., nuclear power), etc. The electrical power is then transmitted along transmission lines 208 (typically high voltage lines called "main trunk lines") to a distribution substation 210, which steps down the voltage before passing the power on to distribution lines 212. The distribution lines 212 may be sub-trunk lines within the distribution substation 210, and/or sub-trunk lines coming out of (from) the distribution substation 210. Electrical power then passes to distribution transformers 214a-n (where "n" is an integer), which drops the final voltage down to that required by the customers. Each customer has an electricity usage meter 216a-n, which meter power coming from individual drop-lines (feeders) 218. Note that the power may pass in series through the different distribution transformers 214a-n, as shown, or else the power may pass directly from the distribution lines 212 to each of the distribution transformers 214a-n.

Data Collection Engine (DCE) server 202, which monitors and collects the data from the various intelligent electricity usage meters 216a-n, is under the control of an analytics server 204. Thus, analytics server 204 preferably has no direct contact with the intelligent electricity usage meters 216a-n, but rather sends requests for information, from the intelligent electricity usage meters 216a-n, to the DCE server 202. Note that DCE server 202 is coupled to feeders 215a-n, which include grouped sets of meters 216. Analytics server 204 monitors and manages the electric power grid 200 according to requested readings, from the intelligent electricity usage meters 216a-n, supplied by the DCE server 202. Analytics server 204 includes a table 220 that describes each of the intelligent electricity usage meters' 216a-n locations along the grid (power lines/feeders). Table 220 also includes a customer name and customer facility associated with each of the electricity usage meters 216a-n, a physical location of each of the electricity usage meters 216a-n, electricity parameters (e.g., voltage, amperage, wattage, waveform, power factor, power loss, etc.) that can be measured by each of the intelligent electricity usage meters 216a-n, a total harmonic distortion measure by each of the intelligent electricity usage meters 216a-n, and/or a distance from distribution substation 210 and/or one or the distribution transformers 214a-n to each of the intelligent electricity usage meters 216a-n.

Analytics server 204 also includes a grid adjustment logic 224, which is able to adjust power being distributed through the electric power grid 200 using relays, remotely controlled switchgear, etc., in response to an analysis of anomalies described below.

Figure 3:
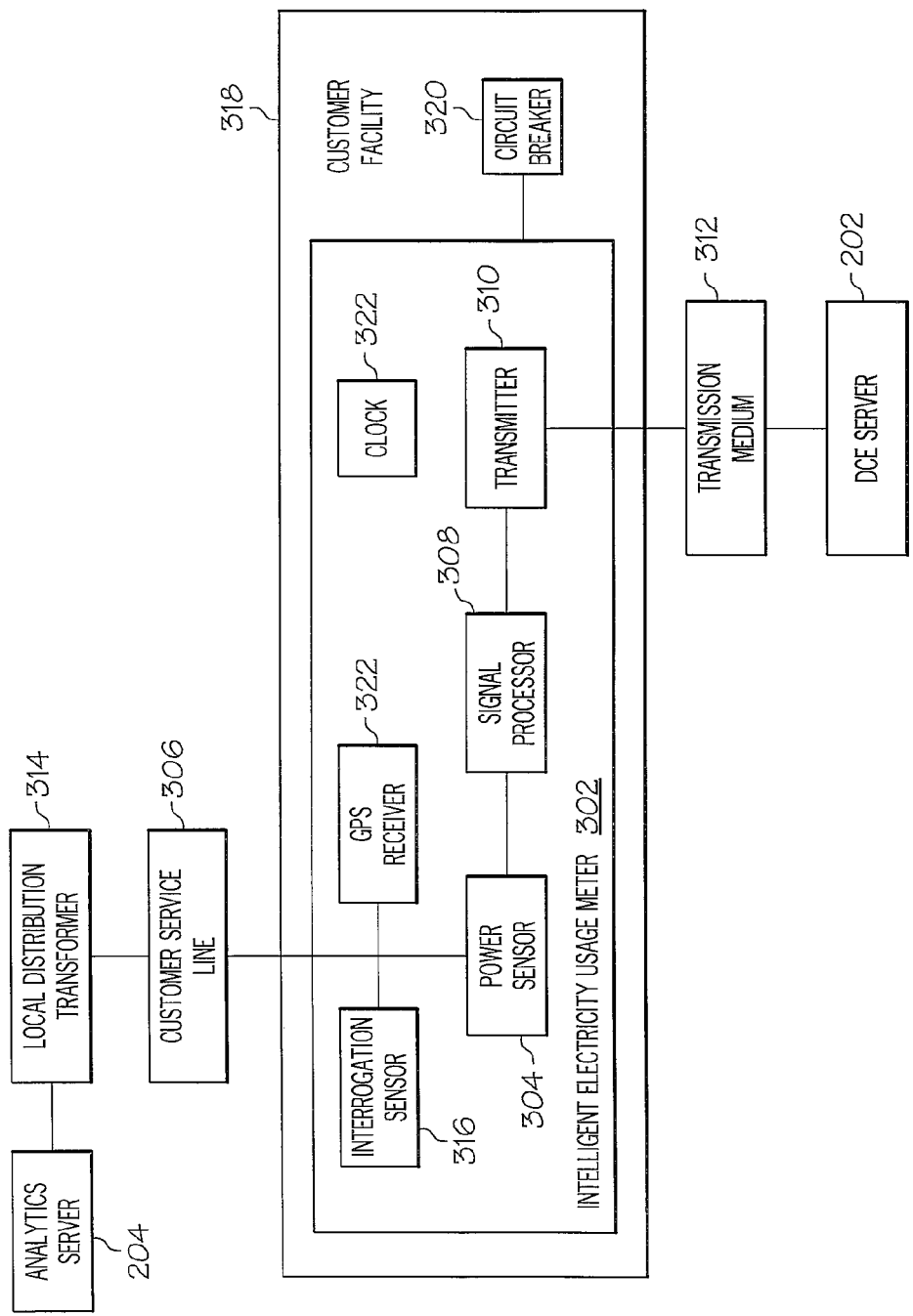
FIG. 3 illustrates an exemplary intelligent electricity usage meter used at a customer facility.

With reference now to FIG. 3, an exemplary intelligent electricity usage meter 302 (i.e., an exemplary Remote Terminal Unit—RTU, as utilized by the present invention), whose architecture may be used in each of the electricity usage meters 216a-n, is presented. Intelligent electricity usage meter 302 includes a power sensor 304, which monitors amperage, voltage, power usage, phase, and/or other characteristics of electrical power read from a customer service line 306 (e.g., one or the drop-lines 218 shown in FIG. 2) going to a customer facility 318. The intelligent electricity usage meter 302 incorporates a signal processor 308, which is able to take readings from power sensor 304 in order to discern advanced analytics of voltage and/or current and/or power using a discrete Fourier transform, an even-odd extraction, root mean square (RMS) of the current or voltage, total harmonic distortion (THD) of the voltage, an RMS/THD relation, a voltage crest factor, a current k-factor, triplens of the current, power factor, real power via dot product, arc detector, and digital filter, a Global Positioning System (GPS) time, etc. All such calculations above can be calculated by analytics servers (e.g., analytics server 204 shown above in FIG. 2).

Continuing with FIG. 3, once the signal processor 308 processes the sensor data from one or more power sensors 304 (which may be voltage sensors, ammeters, etc.) associated with the intelligent electricity usage meter 302, the processed data is then sent to a transmitter 310 (e.g., transmitter 126 shown in FIG. 1), which transmits the processed data, via a transmission medium 312 (e.g., transmission lines 208, a wireless signal, etc.), to the DCE server 202.

Continuing with FIG. 3, note that the intelligent electricity usage meter 302 may also include a clock 322, which describes an exact time at which sensor data is taken by power sensor 304. Similarly, a GPS receiver 322 is able to pinpoint a physical location of the intelligent electricity usage meter 302. Both the recorded time and GPS positioning can be packeted and transmitted to the DCE server 202 and/or the analytics server 204 by the signal processor 308 and the transmitter 310.

The intelligent electricity usage meter 302 also includes an interrogation sensor 316, which is able to receive an interrogation signal from the analytics server 204 (or, alternatively, the DCE server 202). This interrogation signal is essentially an "are you there?" signal, and is transmitted along the customer service line 306. When the interrogation sensor 316 receives the interrogation signal, the signal processor returns a confirmation signal to the DCE server 202 and/or the analytics server 204. Having both the interrogation sensor 316 (for interrogation signal detection) and the power sensor 304 (for power detection) allows the analytics server 204 to determine if the customer service line 306 to a local step-down transformer 314 (e.g., one of the distribution transformers 214*a-n* shown in FIG. 2) has been cut. Consider further the truth table shown in Table I:

TABLE I

| INTERROGATION SENSOR | POWER SENSOR | CONDITION OF DROP LINE |
|---|---|---|
| Interrogation signal received | Voltage detected and power usage measured | Drop line intact |
| Interrogation signal received | Voltage detected but no power usage measured | Drop line intact; problem exists within customer facility |
| No interrogation signal received | Voltage detected | Interrogation sensor logic has failed |
| No interrogation signal received | No Voltage detected | Drop line cut |

As suggested in Table I, if there is no power being used by the customer (and, as shown, voltage is nonetheless being detected as being available to the customer's location), but the interrogation signal is still being received, then a conclusion can be drawn that the customer simply is not drawing any power (because, e.g., a main circuit in circuit breaker 320 has tripped), since the interrogation sensor 316 receives the interrogation signal from the customer service line 306. However, if the interrogation sensor 316 detects no interrogation signal and the power sensor 304 detects no power (voltage, etc.), then a conclusion can be drawn that the customer service line 306 to the customer facility 318 has been cut (assuming that other evidence, such as power to co-users of the local step-down transformer 314 still receiving power, exists to show that the local step-down transformer 314 is operational).

Note that while intelligent electricity usage meter 302 is shown with enhanced capabilities (provided by signal processor 308, transmitter 310, etc.), in one embodiment of the present invention intelligent electricity usage meter 302 may be made up of only power sensor 304, such that the DCE server 202 shown in FIG. 2 processes only voltage and/or amperage readings from the power sensor 304.

Figure 4:
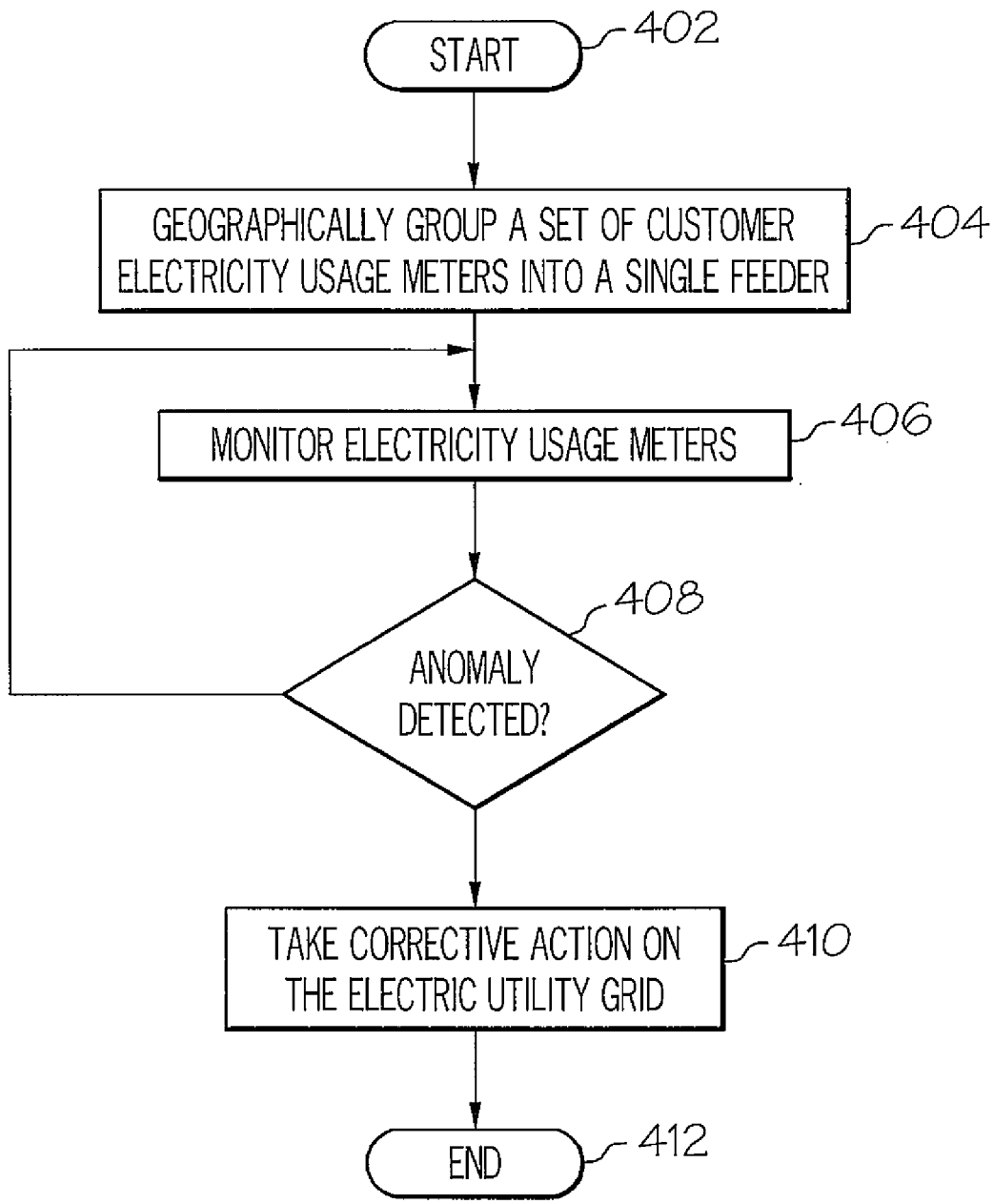
FIG. 4 is a high-level flow-chart describing how to utilize intelligent electricity usage meters to manage an electricity distribution grid.
Figure 5:
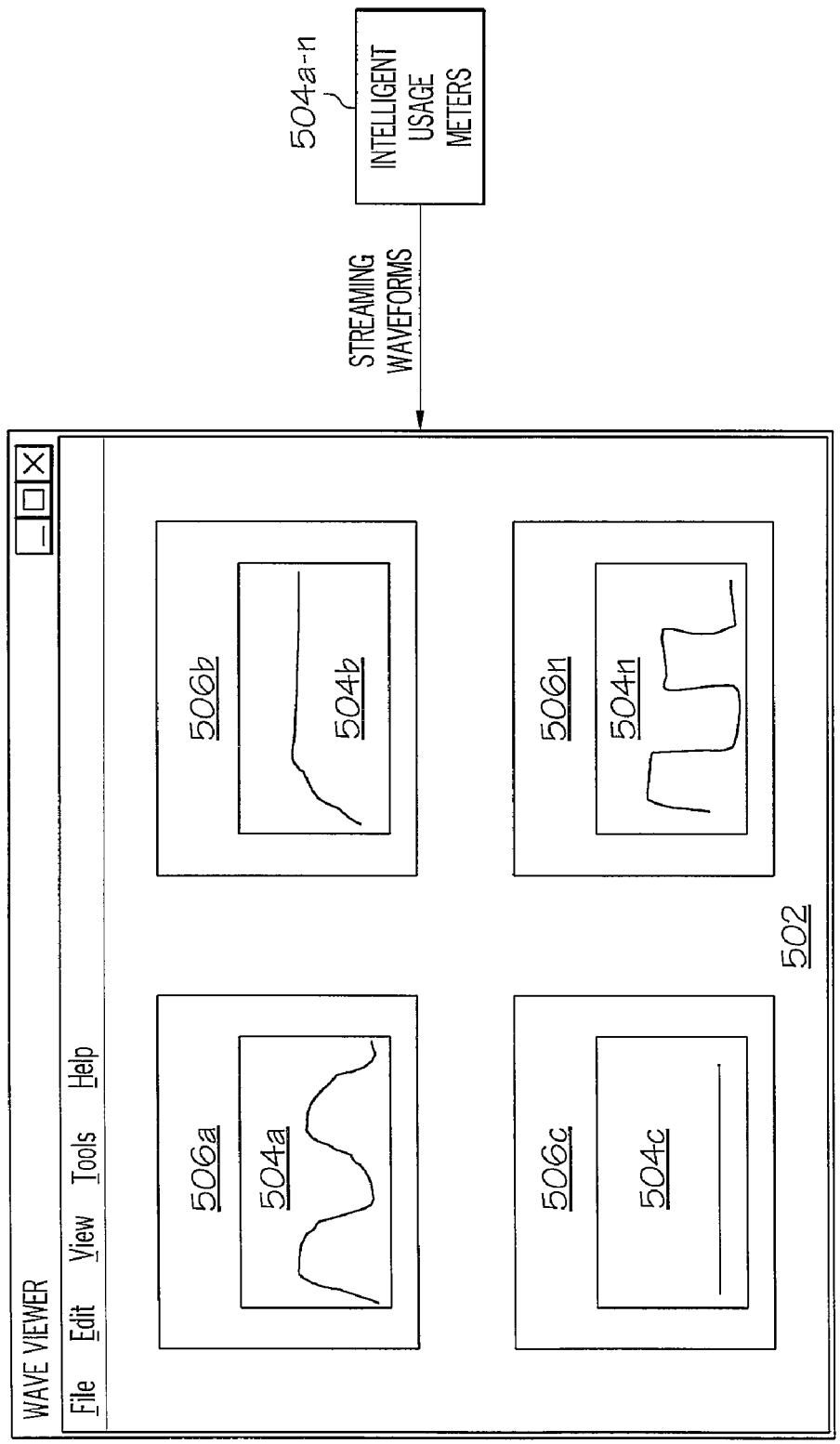
FIG. 5 illustrates a Graphical User Interface (GUI), displayed at an analytics server, for displaying multiple real-time waveforms describing electricity being monitored by multiple Remote Terminal Units (RTUs) on the electricity distribution grid.

With reference now to FIG. 4, a high-level flow-chart of steps taken to utilize customer electricity usage meters to monitor and control an electric utility grid is presented. After initiator block 402, a set of customer electricity usage meters are geographically grouped (to create a fine sensor web along a power line) into a grouped set of electricity usage meters that form a single feeder (block 404). This grouped set of electricity usage meters are then monitored (block 406). A determination is then made as to whether any of the electricity usage meters are reporting an anomaly (query block 408). This determination is made using logic such as that found in the DCE server 208, analytics server 204, and/or signal processor 308 described in FIG. 3 above. In addition, such advanced analytics can also accomplish a real-time waveform streaming and display. For example, assume, as shown in FIG. 5, that a Graphical User Interface (GUI) 502, displayed at the analytics server 204 (shown in FIG. 2) is receiving voltages from multiple intelligent usage meters 504*a-n* (RTUs such as the electricity usage meters 216*a-n* described above). These voltage profiles can be generated by the voltage readings, from a selected subset of meters along the feeder and the meter position, which are then packeted. These digital packets are then streamed in real-time to the GUI 502, resulting in corresponding real-time graphs 506*a-n*. A supervisor, watching the GUI 502 at the analytics server 204, is thus able to determine if power on a particular line is normal (e.g., has no sudden higher or lower voltage along the power grid). Alternatively, the digital packets can be streamed in real-time as simpler voltage profiles to the GUI 802 described below in FIG. 8.

Continuing with query block 408 in FIG. 4, voltage testing at a first and second customer location can provide enough information to conclude that an outage has occurred (e.g., zero voltage at both customer locations can reasonably lead to a conclusion that both locations are on a same feeder line from a same step-down transformer that has failed). Alternatively, detecting a power outage may be accomplished by reading how much total power has been used at a first time (T1), reading how much total power has been used at a second time (T2), and then determining the difference in total power used at times T2 and T1. If the total amount of power used at that customer facility is the same at time T1 and time T2, then a conclusion is drawn that no power is being used and/or received at that customer facility. In another embodiment, the voltage reading itself from one of the intelligent meters can tell whether it is outage. In either case, if the voltage is zero in this facility and other meters linked to the same upstream point, this indicates that the outage is just upstream of a down line, a bad transformer, etc. If both the first and second customer facilities are receiving and/or using no power, then a conclusion is reached that a problem exists with their shared local step-down transformer.

In another embodiment of the activity depicted at query block 408, assume that the first facility is receiving/using power, but the second facility is not. Since the two facilities are coupled to a same local step-down transformer, then a conclusion is properly reached that the local step-down transformer is functioning properly, but that the problem resides somewhere in the first facility. If the drop-line to the first facility is intact (see discussion above on using the interrogation sensor 316 shown in FIG. 3), then a conclusion is properly drawn that the first facility has simply thrown a circuit breaker that is located before (at the supply-side of) the power sensor. In one embodiment, this tripping of the circuit breaker can be confirmed by the signal processor in the intelligent electricity usage meter 302 shown in FIG. 3.

Whatever the anomaly is, if it occurs too many times with one or a group of electricity usage meters, then a determination may be made that additional electricity usage meters need to be monitored, in order to determine the "big picture" cause of the repetitious anomalies.

Once the cause of the anomaly and/or anomalies is determined, then appropriate corrective steps are taken (block 410), such as re-routing power lines, replacing meters, replacing transformers, upgrading transformers and/or power lines, etc. The process ends at terminator block 412.

Figure 6:
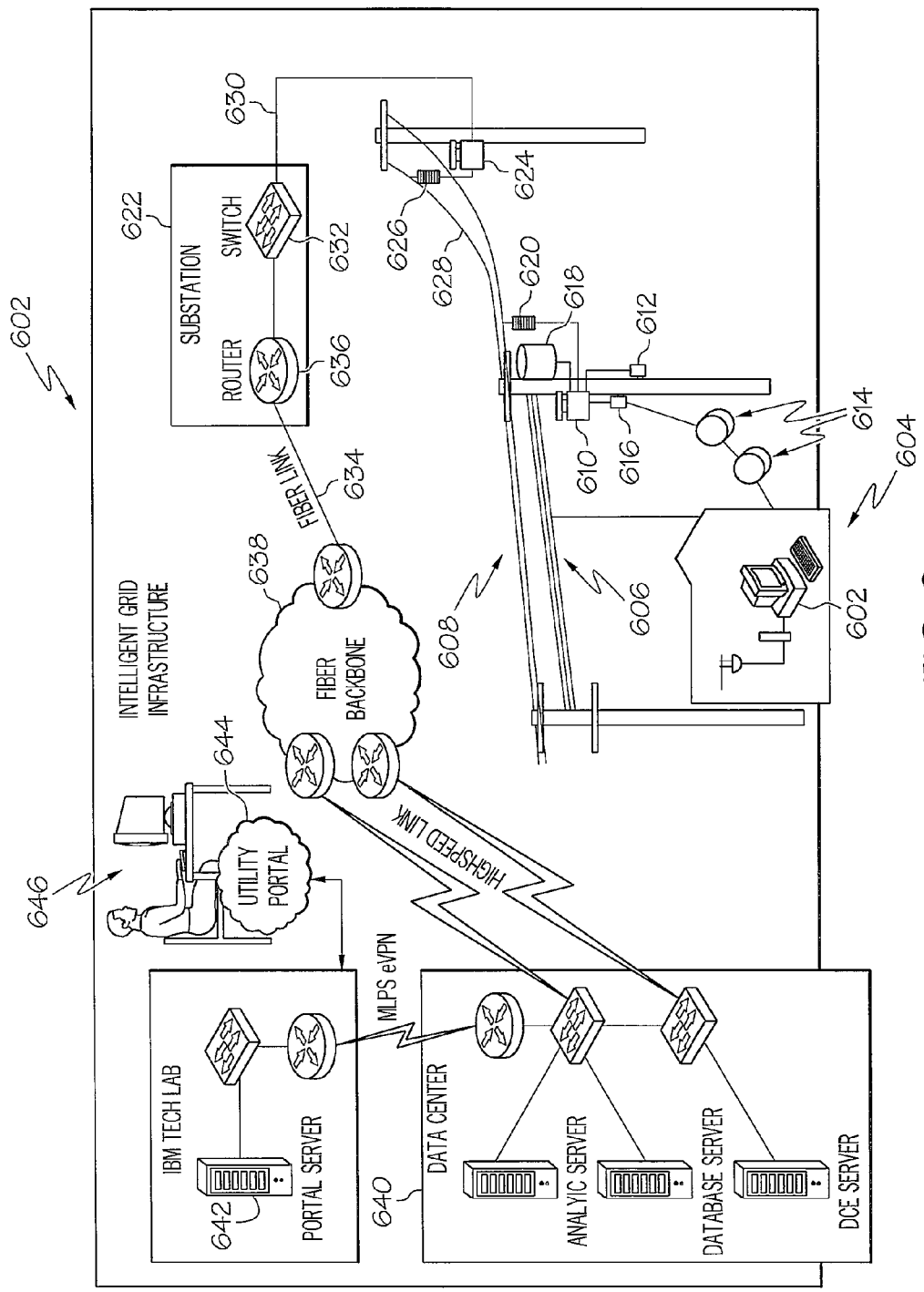
FIG. 6 depicts an alternate representation of an intelligent grid infrastructure.

Referring now to FIG. 6, another view of an intelligent grid infrastructure 600 (similar to the electric power grid 200 shown above in FIG. 2) is presented. A Broadband over Power Line (BPL) modem 602 is located at a customer location 604.

The BPL modem 602 permits data communication directly over the low voltage line 606 and/or medium voltage line 608 via a BPL device 610. Alternatively, the BPL device 610 is able to receive a signal from a smart sensor 612, which detects if electric and/or gas meters 614 detect an anomaly (e.g., an outage, a spike, etc.). Similarly, a cell relay 616 coupled to the electric and/or gas meters can send such anomaly information to the BPL device 610. Note that the BPL device may also be coupled directly to a transformer 618, thus detecting if there is an anomaly (e.g., no power to and/or from) at the transformer 618. The BPL device 610 can be coupled to the medium voltage line 608 via a coupler 620, thus permitting data transmission (describing the anomaly) to a substation 622.

Note that a BPL injector node 624 is needed to boost the BPL signal from the BPL device 610, and is coupled via a coupler 626 to a feeder line 628. Furthermore, the BPL injector node 624 may be coupled to the substation 622 via a separate fiber connection 630. Either way (using the BPL method of communicating over a power line or by converting the BPL signal to a fiber optic signal), data describing readings from the electric and/or gas meters 614 is sent to a switch 632, which ensures that the signal is compatible for transmission along a fiber link 634 via a router 636. The data signal travels through a fiber backbone 638 to a datacenter 640, which includes an analytic server (e.g., analytics server 150 shown in FIG. 1), a database server (for storing and/or processing data), and a Data Communication Equipment (DCE) server for handling incoming data signals (either via the BPL system or a fiber optic system). The processed data is then transmitted to a portal server 642, which allows a utility portal 644 to display data information describing utility conditions on a portal client 646.

Figure 7:
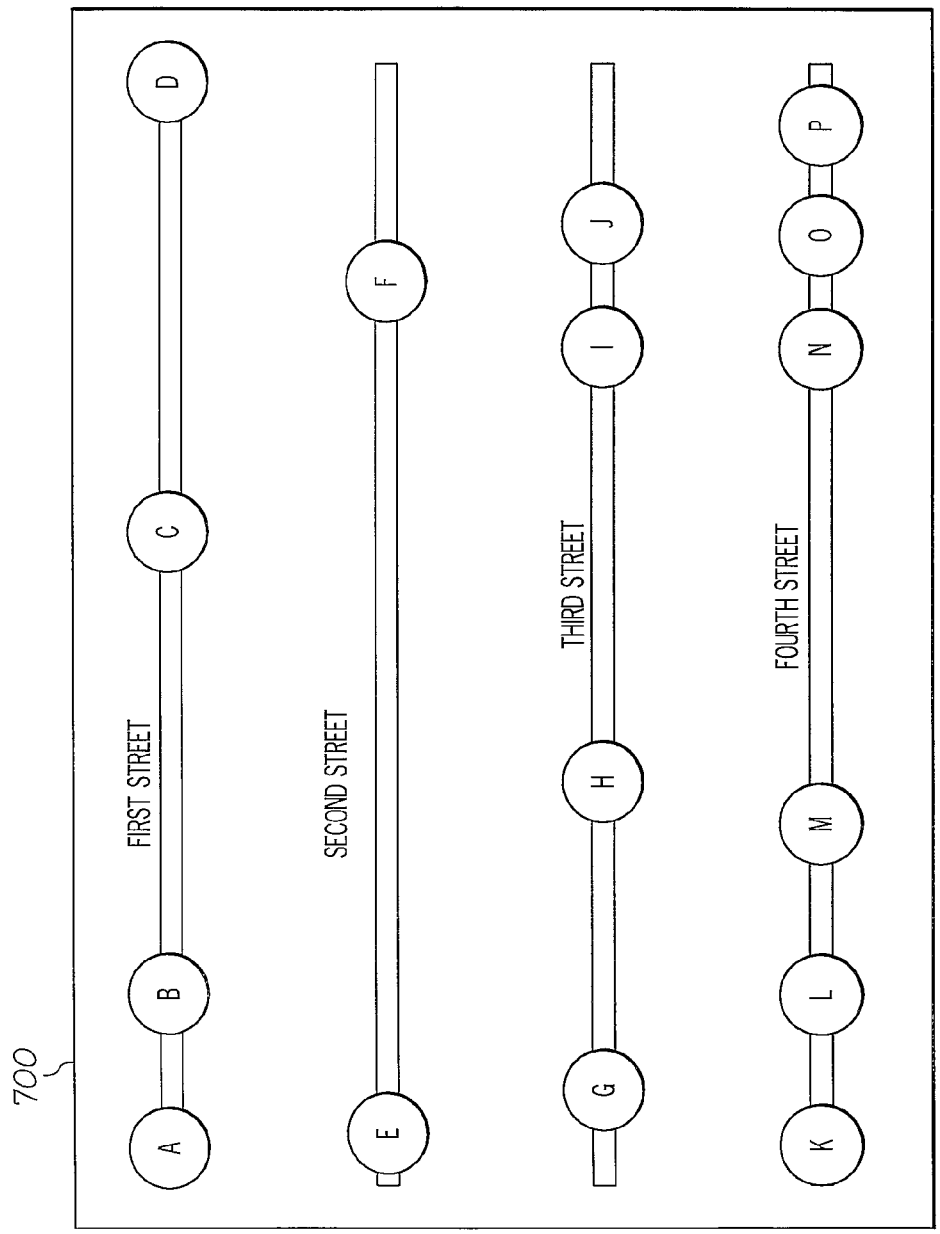
FIG. 7 illustrates a snapshot map showing locations of intelligent meters.
Figure 8:
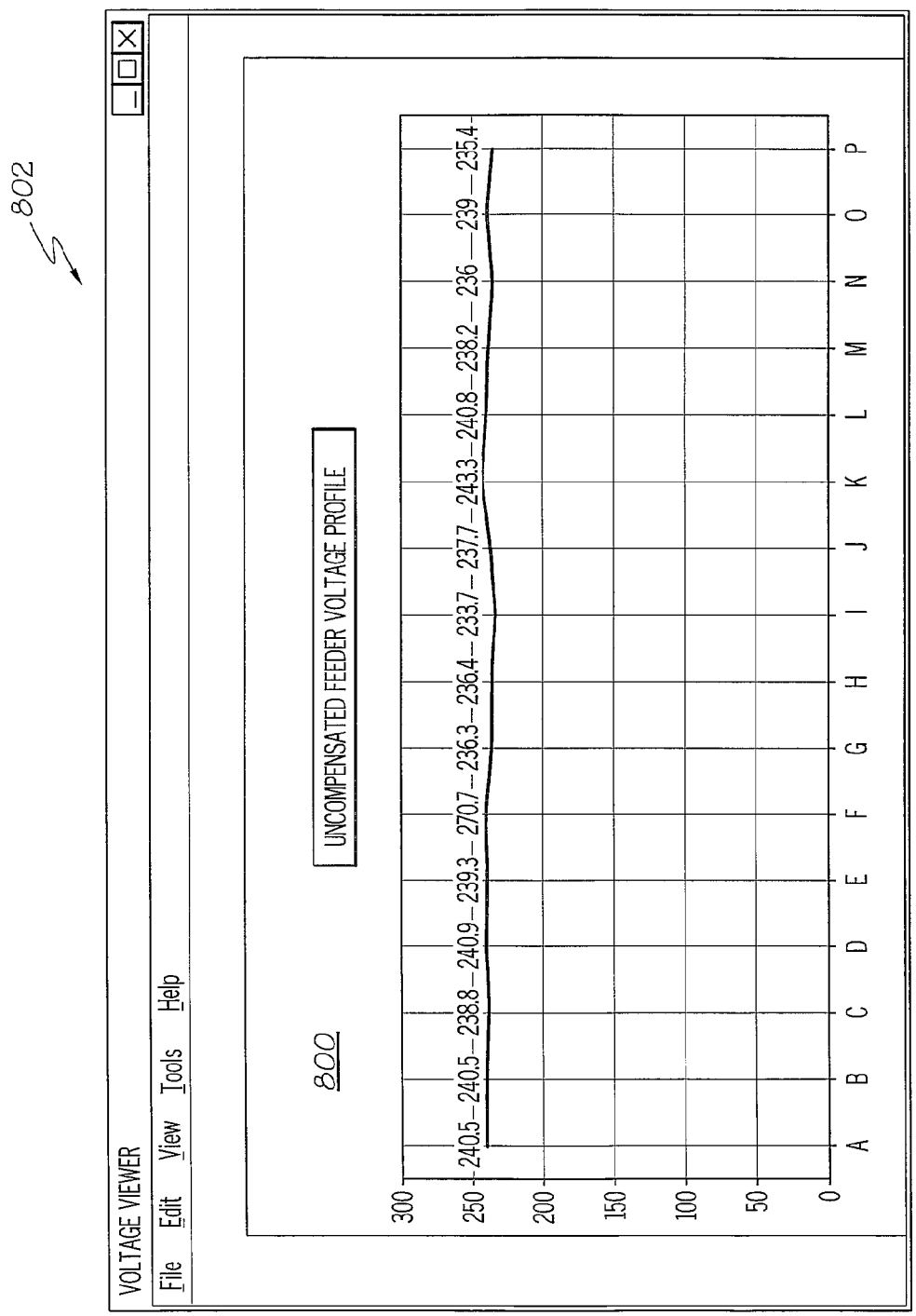
FIG. 8 depicts an exemplary voltage viewer of the intelligent meters shown in FIG. 7.

Referring now to FIG. 7, a snapshot map 700 (derived from a Geographic Information System—GIS) of intelligent meters is presented. As depicted, meter locations A-P are shown at specific addresses on First through Fourth streets. The exact voltage at each mapped location (A-P) can then be presented on an uncompensated feeder voltage profile 800, shown in GUI 802 in FIG. 8. This profile 800 provides a graphical representation (which can be "drilled down" into for more detailed information) to describe the voltage readings at each of the intelligent meters represented and mapped in FIG. 7. Thus, any fluctuation or deviation in voltages can be used to determine/predict hardware and/or line problems that are or will be occurring.

It should be understood that at least some aspects of the present invention may alternatively be implemented in a computer-readable medium that contains a program product. Programs defining functions of the present invention can be delivered to a data storage system or a computer system via a variety of tangible signal-bearing media, which include, without limitation, non-writable storage media (e.g., CD-ROM), writable storage media (e.g., hard disk drive, read/write CD ROM, optical media), as well as non-tangible communication media, such as computer and telephone networks including Ethernet, the Internet, wireless networks, and like network systems. It should be understood, therefore, that such signal-bearing media when carrying or encoding computer readable instructions that direct method functions in the present invention, represent alternative embodiments of the present invention. Further, it is understood that the present invention may be implemented by a system having means in the form of hardware, software, or a combination of software and hardware as described herein or their equivalent.

Software Deployment

As described above, in one embodiment, the processes described by the present invention, including the functions of GML 148, are performed by service provider analytics server 150. Alternatively, GML 148 and the method described herein, and in particular as shown and described in FIGS. 2-8, can be deployed as a process software from analytics server 150 to computer 102. Still more particularly, process software for the method so described may be deployed to analytics server 150 by another service provider server (not shown).

Figure 9A:
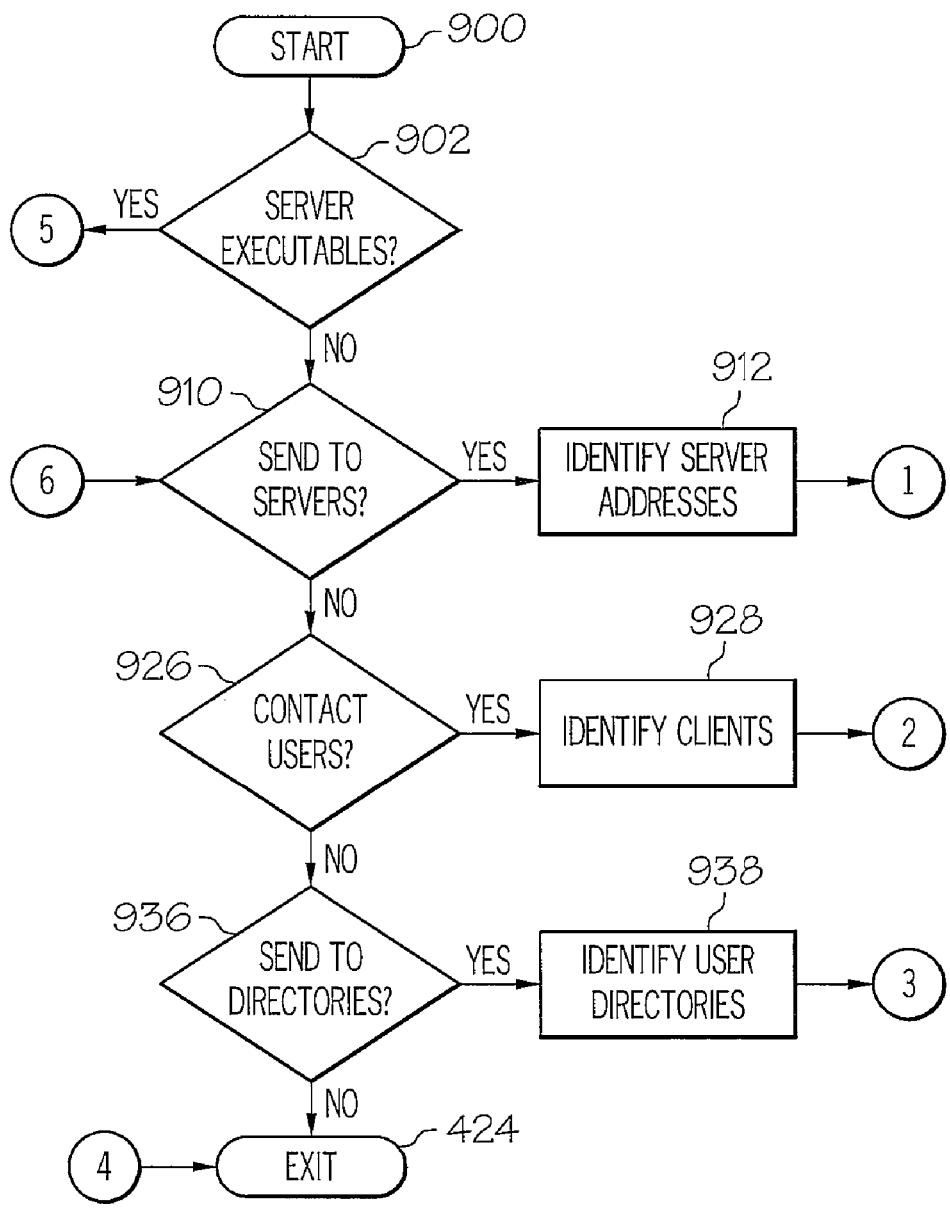
FIGS. 9A-B are flow-charts showing steps taken to deploy software capable of executing the steps and processes described in FIGS. 2-8.
Figure 9B:
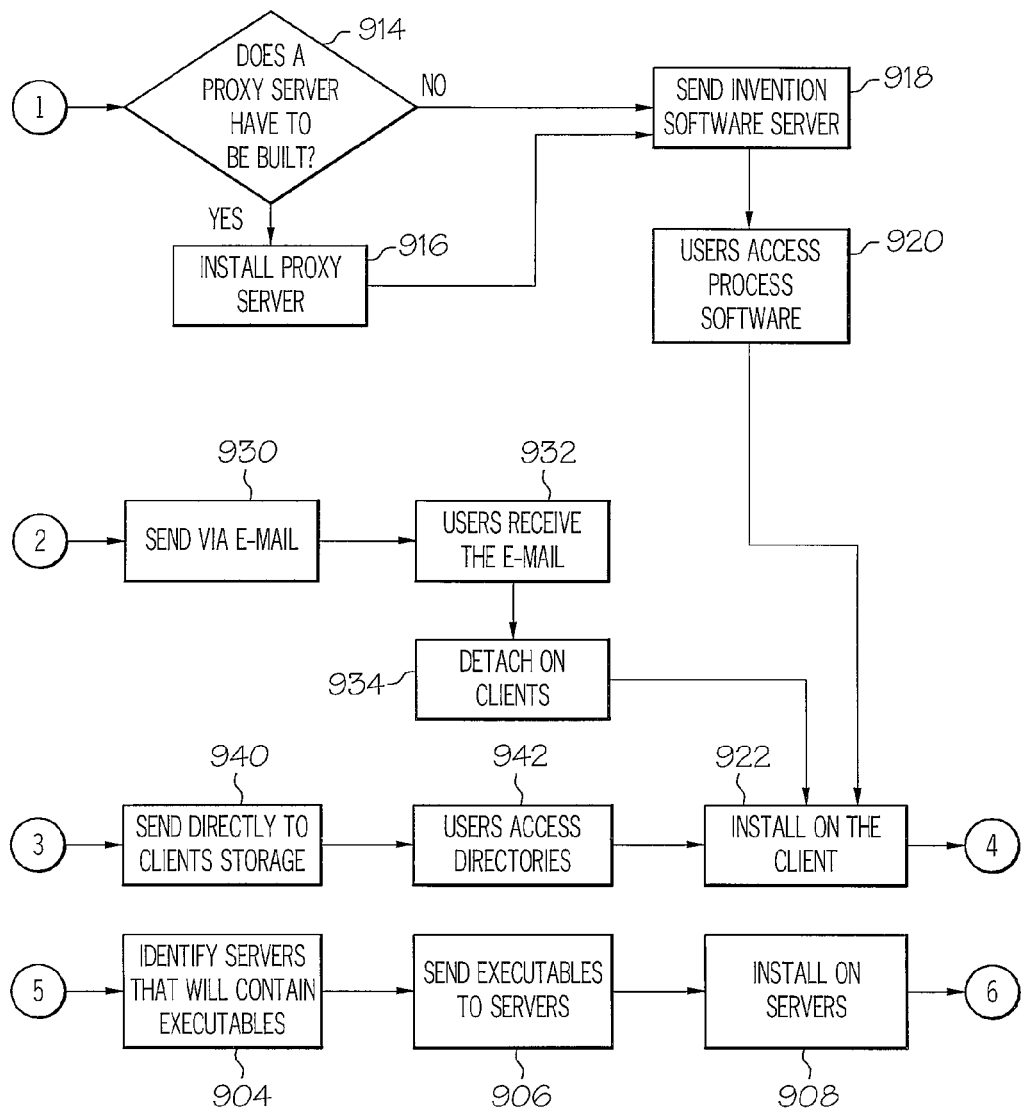

Referring then to FIGS. 9A-B, step 900 begins the deployment of the process software. The first thing is to determine if there are any programs that will reside on a server or servers when the process software is executed (query block 902). If this is the case, then the servers that will contain the executables are identified (block 904). The process software for the server or servers is transferred directly to the servers' storage via File Transfer Protocol (FTP) or some other protocol or by copying though the use of a shared file system (block 906). The process software is then installed on the servers (block 908).

Next, a determination is made on whether the process software is to be deployed by having users access the process software on a server or servers (query block 910). If the users are to access the process software on servers, then the server addresses that will store the process software are identified (block 912).

A determination is made if a proxy server is to be built (query block 914) to store the process software. A proxy server is a server that sits between a client application, such as a Web browser, and a real server. It intercepts all requests to the real server to see if it can fulfill the requests itself. If not, it forwards the request to the real server. The two primary benefits of a proxy server are to improve performance and to filter requests. If a proxy server is required, then the proxy server is installed (block 916). The process software is sent to the servers either via a protocol such as FTP or it is copied directly from the source files to the server files via file sharing (block 918). Another embodiment would be to send a transaction to the servers that contained the process software and have the server process the transaction, then receive and copy the process software to the server's file system. Once the process software is stored at the servers, the users, via their client computers, then access the process software on the servers and copy to their client computers file systems (block 920). Another embodiment is to have the servers automatically copy the process software to each client and then run the installation program for the process software at each client computer. The user executes the program that installs the process software on his client computer (block 922) then exits the process (terminator block 924).

In query step 926, a determination is made whether the process software is to be deployed by sending the process software to users via e-mail. The set of users where the process software will be deployed are identified together with the addresses of the user client computers (block 928). The process software is sent via e-mail to each of the users' client computers (block 930). The users then receive the e-mail (block 932) and then detach the process software from the e-mail to a directory on their client computers (block 934). The user executes the program that installs the process software on his client computer (block 922) then exits the process (terminator block 924).

Lastly a determination is made as to whether the process software will be sent directly to user directories on their client computers (query block 936). If so, the user directories are identified (block 938). The process software is transferred directly to the user's client computer directory (block 940).

This can be done in several ways such as but not limited to sharing of the file system directories and then copying from the sender's file system to the recipient user's file system or alternatively using a transfer protocol such as File Transfer Protocol (FTP). The users access the directories on their client file systems in preparation for installing the process software (block 942). The user executes the program that installs the process software on his client computer (block 922) and then exits the process (terminator block 924).

VPN Deployment

The present software can be deployed to third parties as part of a service wherein a third party VPN service is offered as a secure deployment vehicle or wherein a VPN is build on-demand as required for a specific deployment.

A virtual private network (VPN) is any combination of technologies that can be used to secure a connection through an otherwise unsecured or untrusted network. VPNs improve security and reduce operational costs. The VPN makes use of a public network, usually the Internet, to connect remote sites or users together. Instead of using a dedicated, real-world connection such as leased line, the VPN uses "virtual" connections routed through the Internet from the company's private network to the remote site or employee. Access to the software via a VPN can be provided as a service by specifically constructing the VPN for purposes of delivery or execution of the process software (i.e., the software resides elsewhere) wherein the lifetime of the VPN is limited to a given period of time or a given number of deployments based on an amount paid.

The process software may be deployed, accessed and executed through either a remote-access or a site-to-site VPN. When using the remote-access VPNs the process software is deployed, accessed and executed via the secure, encrypted connections between a company's private network and remote users through a third-party service provider. The enterprise service provider (ESP) sets a network access server (NAS) and provides the remote users with desktop client software for their computers. The telecommuters can then dial a toll-free number or attach directly via a cable or DSL modem to reach the NAS and use their VPN client software to access the corporate network and to access, download and execute the process software.

When using the site-to-site VPN, the process software is deployed, accessed and executed through the use of dedicated equipment and large-scale encryption that are used to connect a company's multiple fixed sites over a public network such as the Internet.

The process software is transported over the VPN via tunneling which is the process of placing an entire packet within another packet and sending it over a network. The protocol of the outer packet is understood by the network and both points, called tunnel interfaces, where the packet enters and exits the network.

Software Integration

The process software which consists of code for implementing the process described herein may be integrated into a client, server and network environment by providing for the process software to coexist with applications, operating systems and network operating systems software and then installing the process software on the clients and servers in the environment where the process software will function.

The first step is to identify any software on the clients and servers, including the network operating system where the process software will be deployed, that are required by the process software or that work in conjunction with the process software. This includes the network operating system that is software that enhances a basic operating system by adding networking features.

Next, the software applications and version numbers will be identified and compared to the list of software applications and version numbers that have been tested to work with the process software. Those software applications that are missing or that do not match the correct version will be upgraded with the correct version numbers. Program instructions that pass parameters from the process software to the software applications will be checked to ensure the parameter lists match the parameter lists required by the process software. Conversely parameters passed by the software applications to the process software will be checked to ensure the parameters match the parameters required by the process software. The client and server operating systems including the network operating systems will be identified and compared to the list of operating systems, version numbers and network software that have been tested to work with the process software. Those operating systems, version numbers and network software that do not match the list of tested operating systems and version numbers will be upgraded on the clients and servers to the required level.

After ensuring that the software, where the process software is to be deployed, is at the correct version level that has been tested to work with the process software, the integration is completed by installing the process software on the clients and servers.

On Demand

The process software is shared, simultaneously serving multiple customers in a flexible, automated fashion. It is standardized, requiring little customization and it is scalable, providing capacity on demand in a pay-as-you-go model.

The process software can be stored on a shared file system accessible from one or more servers. The process software is executed via transactions that contain data and server processing requests that use CPU units on the accessed server. CPU units are units of time such as minutes, seconds, hours on the central processor of the server. Additionally the accessed server may make requests of other servers that require CPU units. CPU units describe an example that represents but one measurement of use. Other measurements of use include but are not limited to network bandwidth, memory utilization, storage utilization, packet transfers, complete transactions etc.

When multiple customers use the same process software application, their transactions are differentiated by the parameters included in the transactions that identify the unique customer and the type of service for that customer. All of the CPU units and other measurements of use that are used for the services for each customer are recorded. When the number of transactions to any one server reaches a number that begins to affect the performance of that server, other servers are accessed to increase the capacity and to share the workload. Likewise when other measurements of use such as network bandwidth, memory utilization, storage utilization, etc. approach a capacity so as to affect performance, additional network bandwidth, memory utilization, storage etc. are added to share the workload.

The measurements of use used for each service and customer are sent to a collecting server that sums the measurements of use for each customer for each service that was processed anywhere in the network of servers that provide the shared execution of the process software. The summed measurements of use units are periodically multiplied by unit costs and the resulting total process software application service costs are alternatively sent to the customer and/or indicated on a web site accessed by the customer which then remits payment to the service provider.

In another embodiment, the service provider requests payment directly from a customer account at a banking or financial institution.

In another embodiment, if the service provider is also a customer of the customer that uses the process software application, the payment owed to the service provider is reconciled to the payment owed by the service provider to minimize the transfer of payments.

Figure 10A:
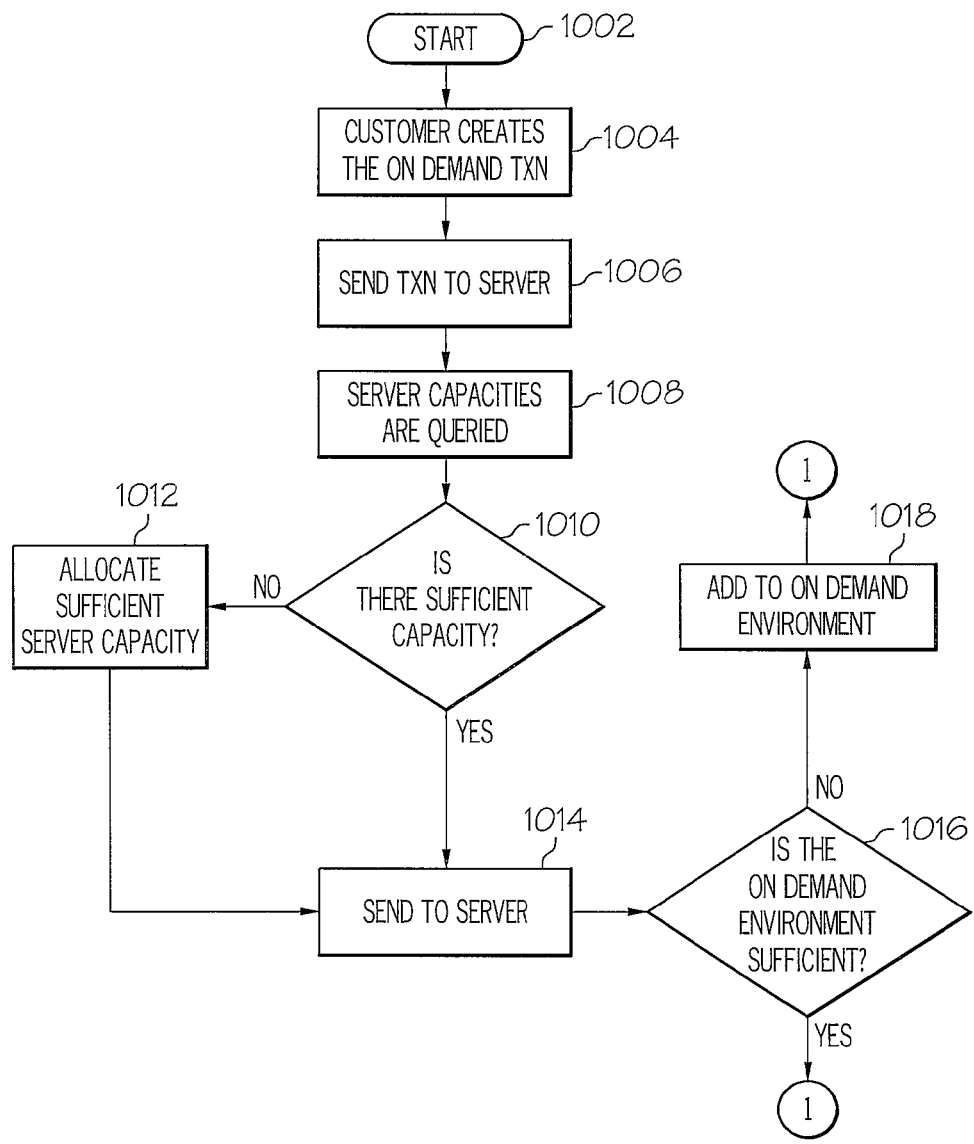
FIGS. 10A-B are flow-charts showing steps taken to execute the steps and processes shown in FIGS. 2-8 using an on-demand service provider.
Figure 10B:
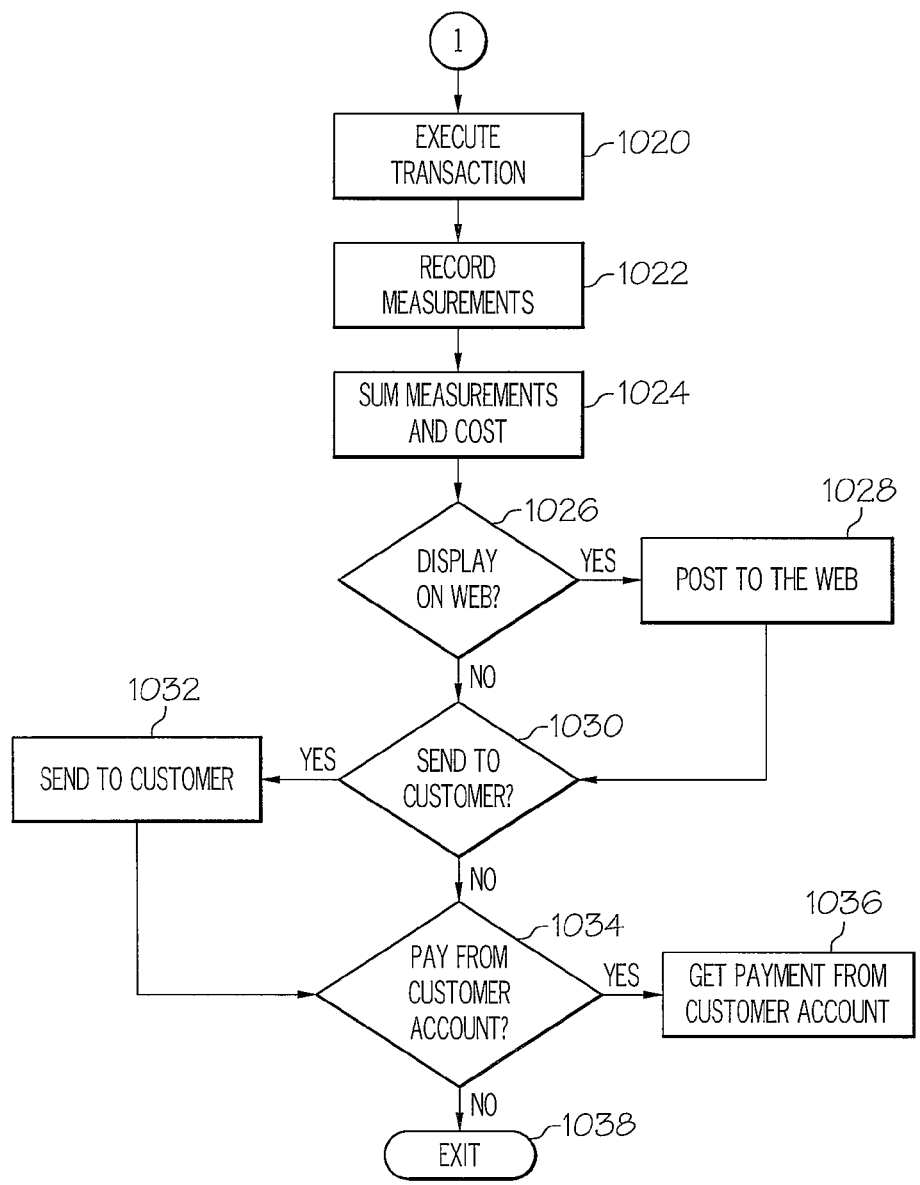

With reference now to FIGS. 10A-B, initiator block 1002 begins the On Demand process. A transaction is created than contains the unique customer identification, the requested service type and any service parameters that further, specify the type of service (block 1004). The transaction is then sent to the main server (block 1006). In an On Demand environment the main server can initially be the only server, then as capacity is consumed other servers are added to the On Demand environment.

The server central processing unit (CPU) capacities in the On Demand environment are queried (block 1008). The CPU requirement of the transaction is estimated, then the server's available CPU capacity in the On Demand environment are compared to the transaction CPU requirement to see if there is sufficient CPU available capacity in any server to process the transaction (query block 1010). If there is not sufficient server CPU available capacity, then additional server CPU capacity is allocated to process the transaction (block 1012). If there was already sufficient available CPU capacity then the transaction is sent to a selected server (block 1014).

Before executing the transaction, a check is made of the remaining On Demand environment to determine if the environment has sufficient available capacity for processing the transaction. This environment capacity consists of such things as but not limited to network bandwidth, processor memory, storage etc. (block 1016). If there is not sufficient available capacity, then capacity will be added to the On Demand environment (block 1018). Next the required software to process the transaction is accessed, loaded into memory, then the transaction is executed (block 1020).

The usage measurements are recorded (block 1022). The utilization measurements consist of the portions of those functions in the On Demand environment that are used to process the transaction. The usage of such functions as, but not limited to, network bandwidth, processor memory, storage and CPU cycles are what is recorded. The usage measurements are summed, multiplied by unit costs and then recorded as a charge to the requesting customer (block 1024).

If the customer has requested that the On Demand costs be posted to a web site (query block 1026), then they are posted (block 1028). If the customer has requested that the On Demand costs be sent via e-mail to a customer address (query block 1030), then these costs are sent to the customer (block 1032). If the customer has requested that the On Demand costs be paid directly from a customer account (query block 1034), then payment is received directly from the customer account (block 1036). The On Demand process is then exited at terminator block 1038.

As described herein, one embodiment of the present invention groups meters according to position along a feeder circuit. The information on how the meters are distributed can be obtained from the utility Geographic Information System, or the meter data management system, to connect meter identification codes with actual geospatial location and grid connectivity. Meter electrical distance from the substation is taken to be the same as that of the distribution transformer to which the meter is connected.

Once the meter tables have been built, an analytics server task schedules regular scans of meter subsets, creates the data requests, and passes them to the meter data collection engine (DCE). The analytics server preferably does not communicate directly with the meters, but rather passes interactive meter read requests to the DCE. When the data are returned by the DCE, the analytics server places the data into a database table that provides for recording the meter identification code, data time stamp, meter distance, and parameter value. The values in this table constitute the parameter profile. An example would be a table of voltage values taken along the length of the feeder, listed with electrical distance to each sensing point. Profiles may be constructed this same way for many different parameters; the parameter may be voltage, current, real or reactive power, power factor, total harmonic distortion, etc. The table may then be accessed by various applications, such as grid volt/VAR control, power quality assessment, outage intelligence, etc. Operation of devices such as capacitors can be determined by changes in the shape of the voltage profile before and after capacitor switching commands, for example. The table can be refreshed with new data periodically by the analytics server.

It may also be the case that specific one-at-a time meter parameter readings are needed to support real time analytics, such as outage intelligence. In this case, the analytics server may use the meter tables or feeder representation that includes meter distribution information to determine which meter or meters to read. The analytics server then may send an interactive read request to the DCE and obtain the appropriate value(s) in return. The analytics server may employ various strategies to determine how many meters and which ones to request reads of at any given time, in order to make best use of DCE characteristics, such as read latency, response variations, variable performance based on number of meters to be read, etc.

While the present invention has been particularly shown and described with reference to a preferred embodiment, it will be understood by those skilled in the art that various changes in form and detail may be made therein without departing from the spirit and scope of the invention. For example, while the present description has been directed to a preferred embodiment in which custom software applications are developed, the invention disclosed herein is equally applicable to the development and modification of application software. Furthermore, as used in the specification and the appended claims, the term "computer" or "system" or "computer system" or "computing device" includes any data processing system including, but not limited to, personal computers, servers, workstations, network computers, main frame computers, routers, switches, Personal Digital Assistants (PDA's), telephones, and any other system capable of processing, transmitting, receiving, capturing and/or storing data.

What is claimed is:

1. A method of managing an electric utility grid, the method comprising:

a computer geographically grouping a set of intelligent electricity usage meters as a set of fine sensors on a power grid, wherein each intelligent electricity usage meter in the set of fine sensors is capable of being remotely monitored, and wherein each intelligent electricity usage meter is coupled to a different customer facility selected from multiple customer facilities;

the computer remotely detecting an anomaly to power being read by at least one intelligent electricity usage meter from the set of fine sensors; and in response to remotely detecting the anomaly, the computer: generating a digitized voltage profile of the anomaly and adjusting power to an electric utility grid to correct the anomaly.

2. The method of claim 1, wherein all of the set of fine sensors are coupled to a same power line via a local step-down transformer, the anomaly is a first power outage to a first customer facility from the multiple customer facilities, and the first power outage is detected by reading a zero input voltage coming into the first customer facility.

3. The method of claim 2, wherein the anomaly further comprises a second power outage to a second customer facility from the multiple customer facilities, and wherein the first power outage and the second power outage indicate a failure to a same local step-down transformer.

4. The method of claim 1, further comprising:
remotely detecting a circuit breaker trip at the first customer facility;
detecting a normal power delivery to a second customer facility from the multiple customer facilities; and
determining that the first power outage at the first customer facility is due solely to the circuit breaker trip at the first customer facility.

5. The method of claim 1, wherein the anomaly is power noise caused by electromagnetic interference on the electric utility grid.

6. The method of claim 1, further comprising:
transmitting the digitized voltage profile to an analytics server.

7. The method of claim 1, wherein the anomaly is a voltage drop on the power line between a first customer facility and a second customer facility from the multiple customer facilities, the method further comprising:
determining if the voltage drop exceeds a pre-determined acceptable level; and
in response to determining that that the voltage drop exceeds the pre-determined acceptable level, generating a work order to correct the voltage drop.

8. The method of claim 1, further comprising:
determining that the anomaly has occurred more than a pre-determined number of occurrences during a pre-determined period of time; and
in response to determining that the anomaly has occurred more than the pre-determined number of occurrences during the pre-determined period of time, monitoring other sets of usage meters for similar anomalies that match the anomaly.

9. The method of claim 1, wherein the anomaly is an absence of electrical power being received at a customer facility, the method further comprising:
transmitting an interrogation signal from a local step-down transformer to an interrogation sensor in an electricity usage meter at the customer facility;
detecting an absence of the interrogation signal at the electricity usage meter;
in response to detecting both the absence of electrical power and the absence of the interrogation signal at the electricity usage meter at the customer facility, concluding that a drop line from the local step-down transformer to the customer facility has been cut.

10. An electric utility grid comprising:
an analytics server for geographically grouping a set of electricity usage meters to create a fine sensor web on the power grid, wherein each electricity usage meter in the fine sensor web is capable of being remotely monitored, and wherein each electricity usage meter is coupled to a different power line monitoring point;
a data collection engine server for remotely detecting an anomaly to power being read by at least one electricity usage meter from the fine sensor web, generating a digitized voltage profile of the anomaly, and transmitting the digitized voltage profile to an analytics server; and
a grid adjustment logic for, in response to remotely detecting the anomaly, adjusting power to an electric utility grid to correct the anomaly.

11. A computer-readable medium on which is stored a computer program, the computer program comprising computer executable instructions configured for:
geographically grouping a set of electricity usage meters to create a grouped set of fine power grid sensors, wherein each electricity usage meter in the grouped set of fine power grid sensors is capable of being remotely monitored, and wherein each electricity usage meter is coupled to a different power line monitor point;
remotely detecting an anomaly to power being read by at least one electricity usage meter from the grouped set of fine power grid sensors; and
in response to remotely detecting the anomaly, generating a digitized voltage profile of the anomaly for transmission to an analytics server and adjusting power to an electric utility grid to correct the anomaly.

12. The computer-readable medium of claim 11, wherein all of the grouped set of fine power grid sensors are coupled to a same local step-down transformer.

13. The computer-readable medium of claim 12, wherein the anomaly is a first power outage to a first customer facility selected from multiple customer facilities, and wherein the first power outage is detected by reading a zero difference between a total amount of power used by the first customer facility at a beginning and at an end of a pre-determined period of time.

14. The computer-readable medium of claim 13, wherein the anomaly further comprises a second power outage to a second customer facility from the multiple customer facilities, and wherein the first power outage and the second power outage indicate a failure to the same distribution transformer.

15. The computer-readable medium of claim 11, wherein the computer executable instructions are further configured for:
remotely detecting a circuit breaker trip at the first customer facility;
detecting a normal power delivery to a second customer facility from the multiple customer facilities; and
concluding that the first power outage at the first customer facility is due solely to the circuit breaker trip at the first customer facility.

16. The computer-readable medium of claim 11, wherein the anomaly is a voltage drop between a first customer facility and a second customer facility from the multiple customer facilities, and wherein the computer executable instructions are further configured for:
determining if the voltage drop exceeds a pre-determined acceptable level; and
in response to determining that that the voltage drop exceeds the pre-determined acceptable level, generating a work order to correct the voltage drop.

17. The computer-readable medium of claim 11, wherein the computer executable instructions are further configured for:
determining that the anomaly has occurred more than a pre-determined number of occurrences during a pre-determined period of time; and
in response to determining that the anomaly has occurred more than the pre-determined number of occurrences during the pre-determined period of time, monitoring other sets of usage meters for similar anomalies that match the anomaly.

18. The computer-readable medium of claim 11, wherein the computer-readable medium is a component of a remote server, and wherein the computer executable instructions are deployable to a supervisory computer from the remote server.

19. The computer-readable medium of claim 11, wherein the computer executable instructions are capable of being provided by a service provider to a customer on an on-demand basis.

* * * * *